United States Patent [19]
Wöhr

[11] Patent Number: 4,925,499
[45] Date of Patent: May 15, 1990

[54] METHOD OF AND AN APPARATUS FOR CONTROLLING A QUANTITY OF AN EXPLOSIVE GAS MIXTURE IN A WORKPIECE TREATMENT CHAMBER

[75] Inventor: Rolf Wöhr, Leonberg, Fed. Rep. of Germany

[73] Assignee: Robert Bosch GmbH, Stuttgart, Fed. Rep. of Germany

[21] Appl. No.: 347,772
[22] PCT Filed: Jul. 7, 1988
[86] PCT No.: PCT/DE88/00423
  § 371 Date: Apr. 4, 1989
  § 102(e) Date: Apr. 4, 1989
[87] PCT Pub. No.: WO89/01377
  PCT Pub. Date: Feb. 23, 1989

[30] Foreign Application Priority Data
  Aug. 8, 1987 [DE] Fed. Rep. of Germany ....... 3726475

[51] Int. Cl.$^5$ .............................................. B23K 7/06
[52] U.S. Cl. ...................... 148/9 R; 266/51; 266/251
[58] Field of Search .................. 148/9 R, 9.5; 266/48, 266/51, 249, 251

[56] References Cited
U.S. PATENT DOCUMENTS 3,475,229 10/1969 Geen et al. .................... 148/9 R
4,024,744 5/1977 Trakhtenberg .................... 72/56
4,591,339 5/1986 Conrad et al. .................... 266/251
4,819,917 4/1989 Cherendin .................... 266/51
4,826,541 5/1989 Bozhko et al. .................... 148/9 R

FOREIGN PATENT DOCUMENTS 0050726 5/1982 European Pat. Off. .
2593911 8/1987 France .

OTHER PUBLICATIONS

Soviet Engineering Research, vol. 1, No. 9, 9-81, p. 104.

*Primary Examiner*—S. Kastler
*Attorney, Agent, or Firm*—Michael J. Striker

[57] ABSTRACT

A method of and an apparatus for controlling a quantity of an explosive gas mixture to be used in treating workpieces with thermal and pressure shocks wherein a signal gas having a predetermined initial pressure is introduced into a workpiece treatment chamber of the apparatus for determining a volume of workpiece loaded into the treatment chamber by a pressure difference between the predetermined initial pressure of the signal gas and a filling pressure thereof, which pressure difference is representative of the volume of the workpieces in the treatment chamber, and metering of the explosive gas mixture is effected in accordance with this pressure difference.

15 Claims, 1 Drawing Sheet

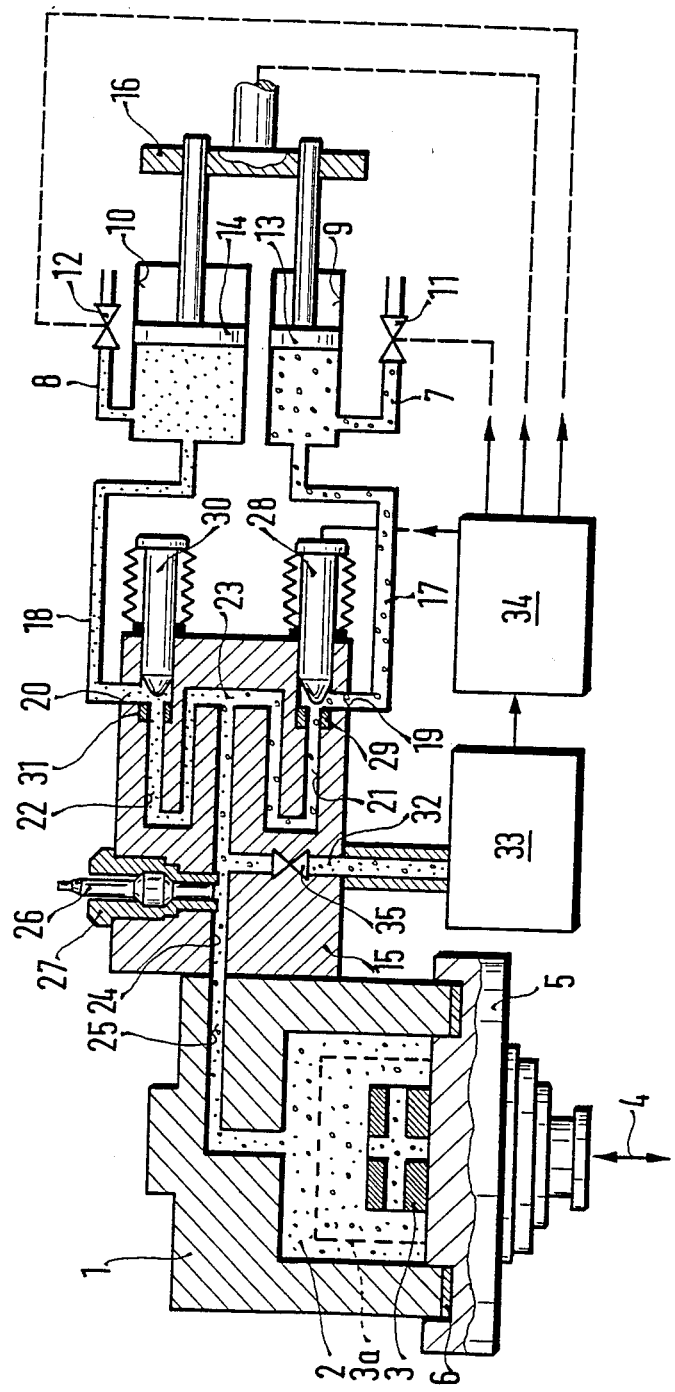

METHOD OF AND AN APPARATUS FOR CONTROLLING A QUANTITY OF AN EXPLOSIVE GAS MIXTURE IN A WORKPIECE TREATMENT CHAMBER

BACKGROUND OF THE INVENTION

The invention relates to on a method of and an apparatus for controlling a quantity of an explosive gas mixture in a treatment chamber for thermal deburring of workpieces. Such a method for eliminating thin burrs and unwanted thin edges and projections on workpieces having considerably thicker cross sections is known from the DE-PS No. 17 52 440. The method is based on the fact that a workpiece to be treated is exposed to a sudden brief heating action within a defined space which is sealed in a pressuretight manner, which heating action is produced by ignition of a quantity of a combustible gas mixture, which quantity is determined beforehand. Aside from the surface-to-volume ratio between the burr and the basic body of the workpiece, as well as the heat conductivity of the work material, it is important and decisive for the results of the thermal workpiece treatment that the degree of admission of the treatment chamber be as high and as uniform as possible, i.e. many small workpieces or a large workpiece which just fits into the chamber must be inserted. With respect to workpiece treatment, only the sum of all surfaces is important. The more surfaces are located in the chamber, the more the heat quantity is distributed.

The heat shock is produced by burning off a combustible gas-oxygen mixture, wherein hydrogen or natural gas and methane, respectively, are used as combustible gas. Two influencing variables are available for controlling the deburring process, namely the gas quantity in the combustion space and the mixture ratio of the gas components. These influencing variables determine the quantity of energy and the temperature. As a rule, metals are deburred with an oxygen surplus, since otherwise only melting, but not a combustion, of the burrs would be effected.

Known systems or apparatus thermal deburring are charged by hand, wherein the workpieces are either placed directly on the closing plate of the treatment chamber or are inserted in a pot or a workpiece holder in the chamber. In order to ensure the most economical operation, the workpieces are sorted beforehand according to size, i.e. workpiece batches with at least approximately the same volumes are combined and treated one after the other. In this way it is possible to maintain the quantity of gas mixture which is determined for the respective batch and adjusted in a metering device of the system until a batch with a different volume is ready to be treated. It is costly and time-consuming to determine and adjust the quantity of gas mixture required for deburring workpieces of different volumes; for this reason, difficulties are encountered in the linking of thermal deburring systems with other workpiece treatment machines in production lines operated in a clocked manner when workpieces having different dimensions are delivered on a conveying device, e.g. a conveyor belt, in an undifferentiated manner.

SUMMARY OF THE INVENTION

The object of the invention, is to provide a method of controlling the quantity of an explosive gas mixture in a workpiece treatment chamber in which a respective volume of the workpieces to be treated, in the treatment chamber, is determined automatically. The result of this volume determination can either be indicated to the operating personnel so that the personnel has the opportunity, if necessary, to correspondingly correct the quantity of gas mixture to be introduced subsequently, or the quantity can be evaluated as a function of the volume of the workpieces for automatically controlling or regulating the quantity of gas mixture. The latter version is suitable particularly for a linking of a thermal deburring system with other workpiece treatment machines in production lines which are operated in a timed relationship, since the checking of the workpiece and material volume, respectively, only lasts a few seconds, and charging can be effected in a completely automatic manner via conveyor belts, handling devices and the like without regard to the respective volume of consecutive workpieces. It is essential that after introducing a workpiece, its volume is first determined and the quantity of explosive gas mixture required for the proper treatment of the workpiece is then metered.

It is particularly advantageous with respect to the construction of the system which is simple and economical with respect to parts, to use at least one component of the gas mixture as a gas for a signal filling of the treatment chamber. Other savings can be achieved in that the gas for the signal filling is admitted into the treatment chamber via the path of the explosive gas mixture.

The present invention as to its construction so to its mode of operation, together with additional objects and advantages thereof, will be best understood from the following description of a preferred embodiment with reference to the accompanying drawing.

BRIEF DESCRIPTION OF THE DRAWING

A single FIGURE of the drawing shows a system for thermally deburring workpieces which operates according to the method of the invention with the structural component elements necessary for understanding the invention.

DESCRIPTION OF THE PREFERRED EMBODIMENT

In the drawing, a workpiece treatment chamber is designated by 1, its combustion space 2, which has a predetermined volume, can be loaded with workpieces having different volumes. A workpiece 3 of relatively small volume is located in the combustion space 2, while a workpiece 3a of considerably greater volume is indicated in dashed lines. Assuming that the workpieces 3 and 3a consist of the same material, e.g. steel, a smaller quantity of gas is required for deburring the smaller workpiece 3 than is required for deburring the larger workpiece 3a, since the latter has a larger surface and mass than the workpiece 3.

The workpieces rest on a closing plate 5 which is movable in the direction of the double arrow 4 and is placed at the end face of the treatment chamber 1, which is open at the bottom, prior to filling the combustion space 2 with gas. A seal 6 is arranged between the plate 5 and the end face.

The gas components of the combustible gas-oxygen mixture are admitted into a metering cylinder 9 for combustible gas and a metering cylinder 10 for oxygen, respectively, from a reservoir, not shown, via a pressure-resistant line 7 and 8, respectively. The line 7, 8 contain an adjustable pressure reducing valve 11 and 12, respectively, Every cylinder has a gas injection piston 13 and 14, respectively, which presses the gas into a mixing block 15 and, from there, into the combustion space 2. The pistons 13, 14 are coupled with one another in the shown embodiment by a yoke 16, so that they execute strokes of the same magnitude under the influence of a force acting on the yoke 16. Systems with hydraulic coupling for gas injection pistons are also known.

The metering cylinder 10 for oxygen has a greater volume than the metering cylinder 9 for combustible gas, so that there is a greater quantity of oxygen at the same filling pressure. A mixture with 100 % oxygen surplus is considered a standard mixture, wherein hydrogen or natural gas and methane, respectively, is used as combustible gas. Metals are deburred with an oxygen surplus in every instance, since otherwise only melting, and not a combustion, of the burrs would take place. The non-oxidizing melting process is applied only occasionally in treatment of plastics.

A pressure-resistant line 17 and 18, respectively, leads into the mixing block 15 in each instance from the metering cylinders 9, 10, the mixing block 15 formed as a massive metal block. The lines 17, 18 open into a connection bore 19 and 20, respectively, in the mixing block 15, gas feed lines 21 and 22, respectively, which are constructed as bores, being connected to the connection bores 19 and 20, respectively. The lines 21, 22 lead to a mixing space 23; a line 24, which guides the gas mixture into the combustion space 2 of the chamber via a bore 25 formed in the treatment chamber 1, leads away from this mixing space 23. A spark plug 26 which projects into the gas discharge line 24 and fits in an insert 27 of the mixing block 15 serves to ignite the gas mixture. Instead of a spark plug, a glow plug or other suitable igniter can also be used. A valve 28, 29 and 30, 31, respectively, is located in each instance between the bores 19, 21 and 20, 22. These valves are opened at the start of the gas mixture injection process and are closed again after the injection of a predetermined quantity of the mixture.

As can be seen in the drawing, another line 32, which is constructed as a bore, branches off from the gas discharge line 24 of the mixing block 15. This line opens into a pressure evaluating device 33 which preferably works electrically and measures the pressure of a predetermined quantity of gas which is admitted into the combustion space 2 prior to the introduction of the explosive gas mixture serving to deburr the workpiece 3 and 3a, respectively. A respective pressure difference P between the initial pressure $P_O$, which corresponds as a rule to the atmospheric pressure, and the filling pressure $P_x$, which is achieved with the predetermined gas quantity, which pressure difference P is proportional to the workpiece volume, is detected by the pressure evaluator 33 and converted into a proportional signal. With the aid of this signal, a control stage 34 connected subsequent to the pressure evaluator 22 determines the quantity of explosive gas mixture required for deburring the workpiece located in the combustion space 2.

The quantity of gas for the signal filling is always considerably smaller than the quantity of the explosive gas mixture to be admitted to the combustion space 2 for the subsequent deburring process. It can be dimensioned in such a way that a pressure up to e.g. a maximum 1 bar is build up in the combustion space 2 according to the volume of the workpiece located therein.

Compressed gas, for example, is suitable as gas for the signal filling and is admitted into the mixing block 15, or directly into the combustion space 2 of the treatment chamber 1, via a special line. However, one or both components of the gas mixture, that is, combustible gas and/or oxygen, is preferably used as gas for the signal filling and is admitted into the combustion space 2 via the gas injection cylinders 9 and 10, respectively, and the lines 17, 19, 21, 24, 25 and 18, 20, 22, 24, 25, respectively. The admission can be controlled by the stage 34 which receives a triggering pulse for this purpose which is either given manually or is derived from the closing movement of the plate 5. The metering of the gas quantity can be effected e.g. via the valve 28, 29 and/or the valve 30, 31. For this purpose, the valve is opened after supplying the triggering pulse by the control stage 34 for a time span such that a predetermined quantity of gas arrives in the combustion space 2 at a predetermined pressure in the metering cylinders 9, 10, which pressure is predetermined by the pressure reducing valves 11, 12. In the shown embodiment it is provided that the combustible gas is used as gas for the signal filling, and the control stage accordingly cooperates with the valve 28, 29.

The predetermined quantity of gas for the signal filling could also be injected into the combustion space by the pistons 13, 14 without restricting the opening time of the valves 28, 29 and 30, 31, respectively, by the control stage 34. This is based on the condition that the filling pressure of the metering cylinders 9, 10 determined the pressure reducing valves 11, 12 is lower than the minimum pressure of the signal gas quantity in the combustion space 2, since there is a pressure equilibrium in the entire system when the valves 28, 29 and 30, 31 are opened, and the differential quantity between the actual quantity of gas in the combustion space after pressure equilibrium and the desired quantity of gas injected by a piston stroke 13, 14 can be predetermined by the control stage 34.

The pressure of the predetermined quantity of gas in the combustion space 2 is lower with workpieces having a smaller volume, but is clearly higher with workpieces having a large volume. The resulting pressure differential between the constant atmospheric initial pressure and the filling pressure of the closed combustion space 2 is detected by a pressure sensor of the pressure evaluator 33 and converted into a proportional signal. The control stage 34 is actuated in response to this signal, as already mentioned, and determines the quantity of the combustible gas-oxygen mixture to be introduced into the combustion space 2 of the treatment chamber 1 subsequently in accordance with a signal parameter, e.g. the magnitude of an electrical voltage. This combustible gas-oxygen mixture is correspondingly smaller with workpieces having a small volume than with workpieces which just fit into the combustion space 2. The magnitude of the piston stroke as well as the adjustment of the pressure reducing valves 11, 12 can be utilized for metering the quantity of gas mixture corresponding to the magnitude of the determine signal; the gas pressure in the cylinders 9, 10, and accordingly the quantity of gas located therein, can be regulated via the pressure reducing valves 11, 12. Both possibilities are indicated in the drawing by dashed connecting lines between three outputs of the control stage 34 and the yoke 16 and the pressure reducing valves 11, 12, respectively.

The apparatus works, in principle, as follows: A workpiece or a pot or holder, respectively, with workpieces is placed on the lowered closing plate 5 of the opened workpiece treatment chamber 1, and its combustion space 2 is subsequently closed so as to be pressure-tight by raising the plate 5. A predetermined quantity of gas (combustible gas and oxygen) is admitted into the metering cylinders 9, 10 at a predetermined pressure via the pressure reducing valves 11, 12. The control stage 34 opens the valve 28, 29 for a predetermined time period in response to a triggering signal, so that a predetermined quantity of combustible gas flows into the combustion space 2 from the cylinder 9 via the lines 17, 21, 24, 25. A pressure is built up in the combustion space 2 and in the lines 21, 22, 24, 25, 32 whose magnitude is dependent on the volume of the workpiece located in the combustion space. The respective pressure is converted into a proportional signal by the pressure evaluator 33 connected to the line 32 and the signal is transmitted to the control stage 34. As a function of the magnitude of the received signal, the control stage determines the quantity of gas in the cylinders 9, 10 by corresponding adjustment of the metering device. This can be effected by changing the cylinder volume by correspondingly adjusting the number of piston strokes of the pistons 13, 14 or by of changing the gas pressure by the pressure reducing valves 11, 12. The quantity of gas mixture fixed in this manner is pushed into the combustion space 2 by means of the pistons 13, 14 via the lines of the mixing block 15 and the treatment chamber 1 when the valves 28, 29 and 30, 31 are opened. The two gases (combustible gas and oxygen) are mixed together in the mixing space 23 and ignited by the spark plug 26 after terminating the filling process. The flame front then advances through the bore 25 to the combustion space 2. During the explosion, a pressure of up to 700 bar and temperatures in the order of magnitude of 3500° C. occur in the combustion space. The pressure evaluating device 33 is protected from the occurring temperature and pressure shocks by a valve 35 which is arranged in the line 32 and is closed during the gas mixture injection and the treatment process.

The method, according to the invention, is equally suited for thermal deburring system which comprise a separate mixing block flanged on at the workpiece treatment chamber as well as for those in which the gas components are admitted directly into the workpiece treatment chamber via separate feed lines and are first mixed there and ignited after mixing.

The system, as shown in the drawing, is not only suitable for the thermal deburring of workpieces, but also for other areas of application. Thus, the method of reticulation of foam material according to the DE-PS No. 15 04 096 or the method for removing porous shapes, e.g. according to the DE-PS No. 23 22 760, can be implemented with such a system.

While the invention has been illustrated and described with reference to a specific embodiment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of determining a quantity of an explosive gas mixture introduced into a workpiece treatment chamber of an apparatus for treating workpieces loaded thereinto with temperature and pressure shocks, said method comprising the steps of:
   filling the workpiece treatment chamber with a signal gas having a predetermined initial pressure; and
   determining a volume of the workpieces loaded into the workpiece treatment chamber by determining a pressure difference between the predetermined intial pressure of said signal gas and a filling pressure of said signal gas, said signal being representative of the volume of workpieces loaded into the chamber, the quantity of an explosive gas mixture to be introduced into the workpiece treatment chamber for providing the temperature and pressure shocks being determined in accordance with said signal.

2. A method according to claim 1, wherein said filling step includes filling the workpiece chamber with a predetermined quantity of at lest one component of the explosive gas mixture as the signal gas.

3. A method according to claim 2, wherein said filling step includes filling the signal gas through a path for the explosive gas mixture.

4. An apparatus for determining a quantity of an explosive gas mixture to be used in treatment workpieces with thermal and pressure shocks, said apparatus comprising:
   a workpiece treatment chamber for receiving workpieces;
   means for filling the workpiece treatment chamber with a signal gas having a predetermined initial pressure; and
   evaluating means for determining a pressure difference between the initial predetermined pressure of the signal gas before it fills said workpiece treatment chamber and a filling pressure of the signal gas, said pressure difference being used for determining the quantity of a gas explosive mixture to be introduced into the workpiece treatment chamber.

5. An apparatus according to claim 4, further comprising a mixing block for mixing components of the explosive gas mixture and having a mixing space communicating with said workpiece treatment chamber;
   adjustable means for metering a quantity of each gas component of the explosive gas mixture into said mixing space with a predetermined mixture ratio;
   a conduit for each gas component of the explosive gas mixture and extending between said metering means and said mixing space for delivering a respective gas component into said mixing space; and
   conduit means for communicating the filling pressure of the signal gas in said workpiece treatment chamber to said evaluating means.

6. An apparatus according to claim 4, wherein evaluating means has an output means, said apparatus, further comprising control means connected with said output means of said evaluating means and said metering means for controlling the quantity of each gas component of the explosive gas mixture metered from said metering means in accordance with said pressure difference.

7. An apparatus according to claim 4, further comprising a gas discharge conduit communicating said mixing block with said workpiece treatment chamber and control means having an output, said conduit means extending between said gas discharge conduit and said evaluating means, said metering means including a adjustable pressure reducing valve located between a supply of the respective gas component and said mixing block, and said metering means communicating with said output of said control means.

8. An apparatus according to claim 4, further comprising control means having an output, said metering means including a gas injection piston for each component of the gas explosive mixture, and said metering means being connected with said output of said control means for determining a stroke of each piston.

9. An apparatus according to claim 4, wherein each conduit for each gas component includes an inlet valve extending into said mixing block, said inlet valve being closed during a workpiece treatment process, said apparatus further comprising control means for opening at least one inlet valve for a predetermined period of time to admit a predetermined amount of the signal gas into said workpiece treatment chamber.

10. A method of treating workpieces with temperature and pressure shocks, said method comprising the steps of:
    loading the workpieces into a workpiece treatment chamber;
    filling the workpiece treatment chamber with a signal gas having a predetermined initial pressure for determining a volume of the workpiece loaded into the workpiece treatment chamber;
    determining the volume of the workpieces loaded into the workpiece treatment chamber by determining a pressure difference between the predetermined initial pressure of the signal gas and a filling pressure of the signal gas, said pressure difference defining the volume of the workpieces loaded into the workpiece treatment chamber;
    metering a gas explosive mixture into the workpiece treatment chamber in accordance with the volume of workpieces loaded thereinto; and
    igniting the gas explosive mixture for producing the temperature and pressure shock.

11. A method according to claim 10, wherein said filling step includes filling said workpiece treatment chamber with at least one component of the gas explosive mixture which one component being used as the signal gas.

12. A method according to claim 11, wherein said filling step includes filling said workpiece treatment chamber with said one component used as the signal gas, through a path for introducing the gas explosive mixture into the workpiece treatment chamber.

13. An apparatus for treating workpieces with temperature and pressure shocks, said apparatus comprising:
    a workpiece treatment chamber for receiving the workpieces;
    means for filling the workpiece treatment chamber with a signal gas having a predetermined initial pressure;
    means for determining the volume of the workpieces loaded into the workpiece treatment chamber by determining a pressure difference between the predetermined initial pressure of the signal gas and a filling pressure of the signal gas, said pressure difference defining the volume of the workpieces loaded into the workpiece treatment chamber;
    means for metering a gas explosive mixture into the workpiece treatment chamber in accordance with the volume of workpieces loaded thereinto; and
    means for igniting the gas explosive mixture after it has been introduced into the workpiece treatment chamber.

14. An apparatus according to claim 13, wherein said filling means comprises means for filling said workpieces treatment chamber with at least one component of the gas explosive mixture which one component is used as the signal gas.

15. An apparatus according to claim 14, wherein said means for filling said workpiece treatment chamber with at least one component of the gas explosive mixture is comprised in means for introducing the gas explosive mixture into said workpiece treatment chamber.

* * * * *